United States Patent
Robins

[11] 3,740,062
[45] June 19, 1973

[54] ADHESIVE IN CAPSULE COATED GASKET
[75] Inventor: Charles I. Robins, Southfield, Mich.
[73] Assignee: McCord Corporation, Detroit, Mich.
[22] Filed: Aug. 13, 1971
[21] Appl. No.: 171,660

[52] U.S. Cl. .................. 277/235 B, 161/DIG. 1
[51] Int. Cl. ............................................. F16j 15/12
[58] Field of Search ................ 277/227, 233, 235, 277/235 A, 235 B, 9, 95; 161/DIG. 1, DIG. 5; 117/100, 111

[56] References Cited
UNITED STATES PATENTS
2,055,471  9/1936  Balfe ............................. 277/235 B
2,695,186  11/1954  Balfe ............................. 277/235 B
2,753,199  7/1956  Victor ............................ 277/235 B
3,565,753  2/1971  Yurkonitz ....................... 161/DIG. 1
3,657,379  4/1972  Hilbelink et al. ............... 161/DIG. 1

Primary Examiner—Samuel B. Rothberg
Assistant Examiner—Robert I. Smith
Attorney—McGlynn, Reising, Milton & Ethington

[57] ABSTRACT

A gasket with a sealant coating and the method of coating the gasket. The gasket is coated with a coating including a dispersion of capsules containing a sealant in a vehicle-binder including a thixotropic agent. The coating is applied by a roller having an elastomeric surface with longitudinal and circumferential grooves therein.

11 Claims, 5 Drawing Figures

INVENTOR.
Charles I. Robins

3,740,062

ADHESIVE IN CAPSULE COATED GASKET

This invention relates to gaskets and more particularly to gaskets used for providing a static seal between opposed surfaces of metal members which are clamped together under pressure. The invention has to do specifically with gaskets used between the cylinder head and block of an internal combustion engine.

The confronting machined faces of the head and block of an internal combustion engine invariably have surface irregularities thereon, such as scratches, machining marks, etc., which must be effectively sealed to prevent leaks from the water and oil passageways extending between the head and block. These surface irregularities cannot always be sealed solely by an embossed or laminated metal gasket having a dried sealant coating thereon, especially in run-in testing of an engine before the engine warms up. As a result customary practice involves the application of a viscous tacky wet sealant to both sides of the gasket just prior to its assembly between the head and cylinder of the engine.

While such wet tacky sealants flow readily into small surface defects in the block and cylinder head, the application of such coatings is not only messy and time consuming but it is also objectionable because chips, dirt, etc. which may deposit on such tacky surface during assembly remain there and may eventually become a source of leaks.

The primary object of the present invention resides in the provision of the gasket having a dry sealant coating thereon which is pressure sensitive so as to seal surface defects between the cylinder block and head both during run-in testing of the engine when it is cold and after the engine warms up to its operating temperature. The sealant of the present invention is rendered effective (that is converted to a wet sticky state) at a pressure substantially higher than encountered in handling and stacking gaskets and, thus, eliminates the problems encountered with conventional wet sealants.

More specifically, the present invention contemplates a gasket having a coating thereon of a conventional wet sealant in capsule form dispersed throughout a layer of a conventional dry sealant which serves as a vehicle when the coating is applied and as a binder for the capsules when the coating dries. The capsules are uniformly dispersed throughout the dried coating and are of predetermined size such as to burst to provide the sealing action of a wet tacky sealant when subjected to a predetermined compressive load.

It is a further object of the present invention to provide a method of roller coating gaskets with a liquid mixture of encapsulated sealant and a vehicle-binder such that the capsules are distributed uniformly over the surfaces of the gasket.

Figure 1:
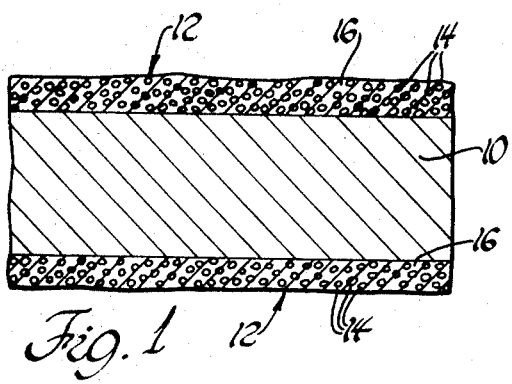
FIG. 1 is a fragmentary sectional view of a gasket according to the present invention.

As stated above, the invention generally contemplates a gasket having a dry sealant coating on opposite sides thereof. The coating comprises a uniform dispersion of encapsulated sealant in a vehicle-binder. The method of making the encapsulated sealant utilized in the present invention involves the well-known coacervation process. In accordance with this process the capsules are formed by causing the deposition of a colloid material around microscopic droplets of sealant as nuclei by a process causing coacervation by dilution of adjustment of the pH to occur in the colloid sol in which the sealant droplets are dispersed and then gelling the colloid to form a wall around the droplet. The capsules are then separated from the liquid in which they are formed, dried and comminuted into powder form.

The sealant employed may be any of the wet tacky sealants conventionally applied to head gaskets during engine assembly, such as polybutene sealants, castor oil base sealants, linseed oil base sealants, etc., which are resistant to oil, water and anti-freeze solutions used in engine cooling systems, such as glycols, alcohols, etc. The encapsulating material is any film forming colloid material such as gelatin, gum arabic, etc., capable of being deposited by coacertive forces and inert to the encapsulated sealant. The present invention is not directed to the method of producing such capsules, which is generally well known, but rather to the production of gaskets having a dry coating thereon in which such capsules of sealant are uniformly dispersed.

In the production of gaskets according to the present invention capsules of a suitable sealant, a polybutene sealant for example, are mixed with a suitable vehicle-binder, applied to both sides of a metal gasket and then dried by heating. This results in a dry coating on the gaskets consisting of a thin layer of a binder, such as varnish or paint, in which the sealant capsules are uniformly dispersed. By controlling such variables as the size of the capsules, their wall thickness, and the weight ratio of capsules to binder, the pressure required to burst the capsules and release the wet tacky sealant can be varied. It is important that the bursting pressures of the capsules be substantially higher than those pressures encountered in normal stacking and handling of gaskets since it is desired that the sealant be released only when the cylinder head is applied to the block and the securing bolts are tightened to the recommended torque. A bursting load of about 1,000 p.s.i. is preferred to avoid unintentional release of the sealant such as might occur when the gasket is stepped on or otherwise subjected accidentally to a load somewhat higher than encountered in normal handling and stacking.

The selection of the proper size of capsules is very important. Capsule size not only affects the burst load of the capsules, but perhaps even more important, it seriously affects the ability to apply a uniform layer of coating on the gasket. If the capsules are too large, they not only tend to settle in the vehicle-binder but also tend to agglomerate when the coating is applied to the gasket. While the reason for this tendency to agglomerate is not completely understood, this problem is solved by controlling the size of the capsules to within a predetermined range and by applying the coating to the gasket in the manner hereinafter described.

Figure 2:
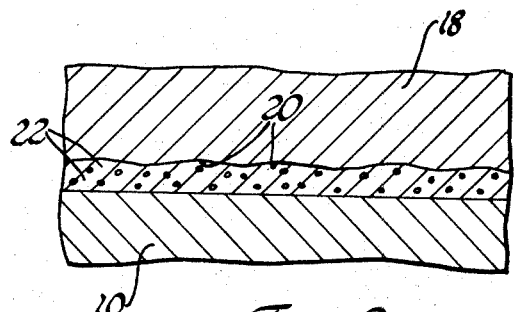
FIG. 2 is a view similar to FIG. 1 and showing the manner in which the sealant is released by bursting the capsules when the gasket is subjected to pressure such as by being clamped between the cylinder head and block of an internal combustion engine.

A gasket in accordance with the present invention is illustrated in FIGS. 1 and 2. The gasket illustrated is a metal gasket designated 10 and the layer of sealant thereon is designated 12. Based upon the magnitude of surface defects usually encountered on the machined surfaces of cylinder heads and blocks, it is preferred that the thickness of layer 12 be between 0.001 to 0.005 inch when dried and in many applications. Approximately 0.003 inch has been found satisfactory. As shown in FIG. 1, layer 12 consists of a dispersion of capsules 14 within a dried vehicle-binder 16. The vehicle-binder 16 can be any material which when dried is adapted to form an adherent coating on the gasket capable of retaining capsules 14 evenly dispersed therethrough. Water and oil resistant varnish or paint such as a commercially available aluminum gasket varnish is admirably suited for this purpose.

In FIG. 2 a cylinder head 18 is shown clamped down on the gasket. The machined surface of the cylinder head has slight crevices 20 thereon in the form of scratches and machining marks which are shown highly magnified. When the cylinder head is clamped against the gasket so as to exert a relatively high compressive load thereon, over 1,000 p.s.i. for example, capsules 14 throughout layer 16 burst and release the wet tacky sealant. The sealant (which is designated 22 in FIG. 2) is thus caused to flow into the crevices 20 and thereby seal the same. However, since the sealant 22 is somewhat restrained by the porous compressible layer of varnish 16 and the bursted walls of the capsules it does not flow as readily as it would normally flow when subjected to pressure in its free state and thus breaks out of layer 16 only by reason of the relatively high compressive load applied to the gasket.

It is believed that by reason of the fact that the sealant is encapsulated and retained as the layer on the gasket together with a dry binder the sealing performance of the gasket is superior to the sealing performance of gaskets as conventionally coated with a dry coating and with a supplemental wet coating.

Figure 5:
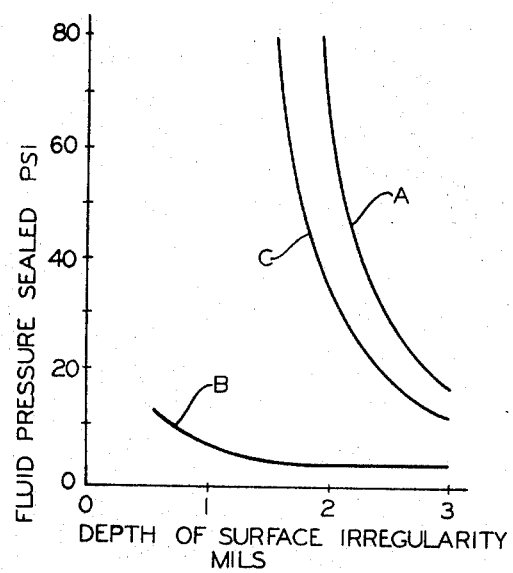
FIG. 5 is a graph showing the sealing performance of the gasket of the present invention in comparison with gaskets having sealant applied thereto in the conventional manner.

In FIG. 5 curve A shows the sealing performance of a gasket material in accordance with the present invention. Curve B shows the sealing performance of a gasket material having a conventional dry coating thereon such as an aluminum gasket varnish. Curve C shows the sealing performance of a gasket material having a conventional dry coating and also a conventional supplemental wet coating. In the gasket the performance of which is shown by Curve A the encapsulated sealant is the same as the sealant used for the wet coating of the gasket material represented by curve C and the vehicle-binder was the same as the varnish used as the conventional dry coating for the gasket whose performance is designated by curve B. All three gaskets were subjected to the same load. The superior performance of the gasket of the present invention is clearly illustrated by the relationship of curve A relative to curves B and C. For example, FIG. 5 shows that the gasket of the present invention was capable of sealing a pressure of about 80 pounds per square inch in a crevice having a depth of about 2½ mills while a conventional gasket with a supplemental wet coating was capable of sealing 80 pounds pressure only when the depth of the crevice was less than 2 mills. It is understood, of course, that these sealants are subjected to fluid pressure by reason of the fact that the gasket has to seal water and oil passageways extending between the cylinder head and block.

It has been discovered that unexpected results are obtained by applying the coating to the gaskets with a roller. As indicated previously, the capsules must have a size within a predetermined range in order to avoid agglomerating or clumping of the capsules in the coating. It has been discovered that the capsule size should lie in the range of about 10 to 100 microns in diameter. The ideal capsule size is about 50 microns. In any event, where the size distribution of the capsules lies in the range of 10 to 100 microns, it has been determined that at least 90 percent of the capsules should have a diameter of less than 80 microns and that at least 50 percent of the capsules should have a diameter of between 35 and 55 microns. Each capsule preferably comprises by weight about 90 percent sealant and 10 percent wall material. Further, it has been discovered that the total liquid coating should not comprise more than 30 percent capsules by weight.

The viscosity of the wet tacky sealant should be adjusted such that it will not flow too freely and nevertheless flow sufficiently under compression to fill the voids or crevices in the machined surfaces of the head and block. For example, in the case of a polybutene type of sealant excellent results have been obtained where the sealant had a viscosity 0f 373 seconds at 76° F with a No. 4 Ford cup. The viscosity of the binder-vehicle should also be controlled within limits so that it will retain the capsules and be capable of being applied to the gasket as a coating of suitable thickness without sagging and running. Where the vehicle-binder used is an aluminum gasket varnish a viscosity of 65 to 80 seconds at 77° F with a No. 4 Ford cup has proved very satisfactory. The viscosity of the final mixture may be increased by the addition of a thixotropic agent to obtain a consistency suitable for applying the desired thickness of coating to the gasket. While various thixotropic agents may be employed, excellent results have been obtained with a material sold under the trademark Cab-O-Sil, Grade M5, by Cabot Corporation of Boston, Massachusetts.

A final coating mixture which has been very satisfactory has a composition by weight of about 75 to 85 percent vehicle-binder and 25 to 15 percent capsules. A typical composition by weight of the coating liquid is as follows: 80 percent C-5 aluminum gasket varnish (McCord Corporation of Detroit, Michigan), 2.5 percent Cab-O-Sil, Grade M5, 18.0 percent encapsulated material sold under trademark McCorseal (polybutene type sealant marketed by McCord Corporation of Detroit, Mich.). The above composition has a viscosity of 350 seconds at 77° F with a No. 4 Ford cup, although satisfactory results have been obtained when the viscosity lies in the range of about 250 to 280 seconds at 77° F with a No. 4 cup.

Figure 3:
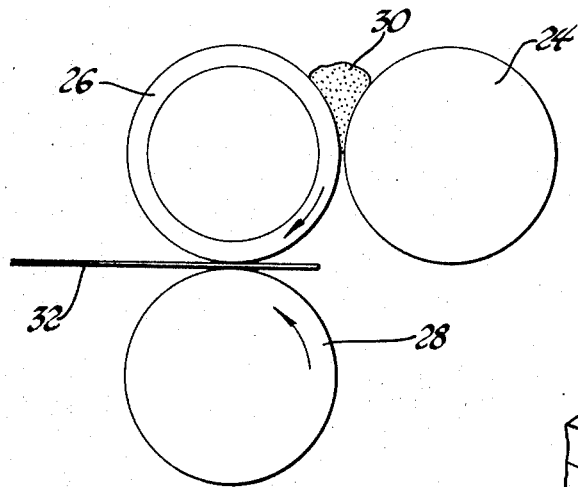
FIG. 3 is a somewhat diagrammatic view showing the roller arrangement for coating the gaskets according to the present invention.

The roller coating arrangement for applying the above mixture to gaskets is diagrammatically shown in FIG. 3. This arrangement includes a doctor or metering roll 24, applicator roll 26 and a travel or drive roll 28. The coating liquid 30 is supplied between the doctor roll 24 and the applicator roll 26 and gasket 32 is directed between the applicator roll 26 and the travel roll 28. Roll 24 and roll 26 are spaced apart slightly and roll 26 and roll 28 are also spaced apart slightly so as to apply to the gasket, a layer of liquid coating which when dried will have the desired thickness which, as indicated above, is preferably about 0.005 inch.

Figure 4:
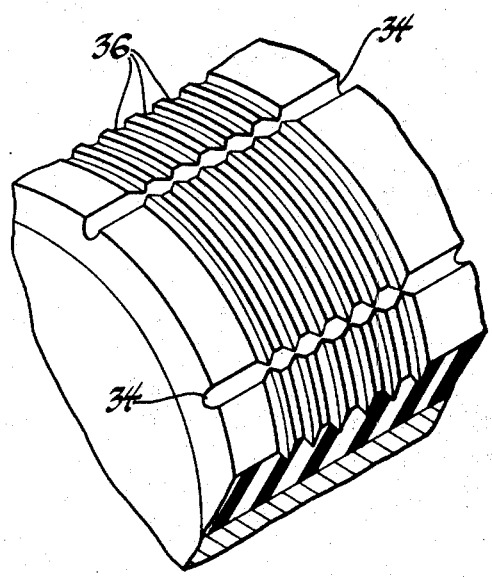
FIG. 4 is a sectional view of one form of applicator roll usable in roller coating the gaskets.

It has been determined that even when the capsule size is within the desired predetermined range, clumping and agglomeration of the capsules in the layer of coating liquid on the gasket can be avoided if applicator roll 26 is a grooved roll formed on an elastomeric material. The grooved configuration on the eleastomeric surface of the applicator roll 26 is shown in FIG. 4. Very satisfactory results have been obtained with grooved urethane rolls (steel core with an outer urethane coating) having a durometer hardness (Shore A) of 20–40 or neoprene grooved rolls having a durometer hardness (Shore A) of 65–70. The surface of the applicator roll should be grooved both lengthwise and circumferentially. Stated differently, the surface of the applicator roll should consist of a series of relatively small areas each surrounded by grooves on all sides thereof. For example, in the arrangement shown in FIG. 4 the roll has a plurality of lengthwise U-shaped grooves 34 and a plurality of circumferential grooves 36. While the sizes and shapes of the grooves can vary considerably, satisfactory results have been obtained where the grooves 34 are spaced apart circumferentially about ¼ inch and grooves 36 are spaced apart at the rate of about 36 per lineal inch of roll. The width and depth of these grooves will determine to a large extent the maximum thickness of wet coating that can be applied to the gasket without producing clumping or agglomeration of the capsules using the composition set forth above. Satisfactory results have been obtained to produce a coating having a dry thickness of about 0.005 inch where grooves 34 are approximately U-shaped, measuring 0.017 inch wide by 0.005 inch deep, and grooves 36 are V-shaped, measuring about 0.025 inch at the surface of the roll to about 0.004 inch at the base of the V and extending 0.005 to 0.010 inch deep. It will be appreciated that other grooved configurations can be successfully employed.

In coating gaskets in accordance with the present invention the gaskets, if metallic, should first be pre-cleaned and phosphatized. Thereafter the gaskets can be coated on both sides thereof in the manner illustrated in FIG. 3 using a grooved applicator roll 26. After the liquid coating is applied to both sides of the gasket, they are suspended vertically and conveyed through an oven to cure and dry the coating material. After curing the gaskets can be cooled and packaged in any suitable manner.

The embodiments of the invention in which an exclusive property or privilege is claimed are defined as follows:

1. A gasket for sealing the confronting faces of a pair of members comprising a gasket having a coating thereon comprising a dispersion of capsules in a layer of a vehicle-binder, each of said capsules having a rupturable outer wall deposited around a necleus of wet tacky sealing material, said capsules being rupturable to permit said wet tacky sealant to flow throughout the surface of the gasket when subjected to a predetermined compressive load.

2. A gasket as set forth in claim 1 wherein said vehicle-binder is a varnish-like material resistant to water, oil and anti-freeze materials used in the cooling systems of internal combustion engines.

3. A gasket as set forth in claim 1 wherein said wet tacky sealant is a viscous material which flows under pressure and which is resistant to water, oil and anti-freeze materials used in the cooling systems of internal combustion engines.

4. A gasket as set forth in claim 1 wherein said layer is about 0.005 inch thick.

5. A gasket as set forth in claim 1 wherein said capsules range in size from about 10 microns to 100 microns.

6. A gasket as set forth in claim 1 wherein said capsules have a maximum size of about 100 microns and have a size distribution of at least 90 percent less than 80 microns and at least about 50 percent between 35 and 55 microns.

7. A gasket as set forth in claim 6 wherein each capsule comprises about 10 percent wall material and 90 percent wet sealant.

8. A gasket as set forth in claim 1 wherein said coating is capable of withstanding a compressive load of about 1,000 p.s.i. before said capsules burst to release said sealant.

9. A gasket as set forth in claim 1 wherein said coating includes a thixotropic agent upon application.

10. A gasket for sealing the confronting faces of a pair of metal members having passageways therethrough comprising a gasket having openings therein which register with said passageways when placed between said faces, said gasket having a coating thereon comprising a uniform dispersion of capsules in a dry adherent layer of a vehicle-binder, each of said capsules having a pressure rupturable outer wall formed of a gelled film-forming colloid material deposited around a necleus of wet tacky sealing material by coacervate forces, said capsules extending to the surface of said coating and being retained in situ by said adherent layer of vehicle-binder, said capsules being present in such abundance as to burst and thereby permit said wet tacky sealant to flow throughout the surface of the gasket when subjected to the predetermined compressive load.

11. A gasket as set forth in claim 10 wherein said layer is between 0.001 and 0.005 inch thick, said capsules range in size from 10 to 100 microns and a size distribution of at least 90 percent less than 80 microns and at least 50 percent between 35 and 55 microns, each capsule comprises approximately 10 percent wall material and 90 percent wet sealant by weight, and said coating includes a thixotropic agent upon application.

* * * * *